United States Patent [19]

Sugiyama et al.

[11] 4,352,981
[45] Oct. 5, 1982

[54] PHOTOELECTRIC FOCUS AND TRACKING APPARATUS

[75] Inventors: Toshio Sugiyama, Toyokawa; Takeshi Maeda, Kokubunji, both of Japan

[73] Assignee: Hitachi, Ltd., Tokyo, Japan

[21] Appl. No.: 144,920

[22] Filed: Apr. 29, 1980

[30] Foreign Application Priority Data

May 9, 1979 [JP] Japan ................................ 54-55729

[51] Int. Cl.³ .............................................. G01J 1/20
[52] U.S. Cl. ....................................... 250/201; 369/45
[58] Field of Search .................... 369/44, 45; 250/201, 250/202, 204

[56] References Cited

U.S. PATENT DOCUMENTS

| | | | |
|---|---|---|---|
| 4,128,847 | 12/1978 | Roullet et al. | 369/45 |
| 4,142,209 | 2/1979 | Hedlund et al. | 369/44 |
| 4,203,133 | 5/1980 | Bricot et al. | 250/201 |
| 4,243,848 | 1/1981 | Utsumi | 250/202 |

*Primary Examiner*—David C. Nelms
*Attorney, Agent, or Firm*—Antonelli, Terry & Wands

[57] ABSTRACT

In the case where the focus control or the tracking control of a light beam is performed by using the wobbling method in an optical information reproducing apparatus, the envelope of the reproduced signal obtained from the light reflected from the recording medium in a non-modulated state is diode-detected and the detected output is used as a focus control signal while the envelope of the reproduced signal obtained from the recording medium in a modulated state is diode-detected so as to be used as a tracking control signal.

14 Claims, 10 Drawing Figures

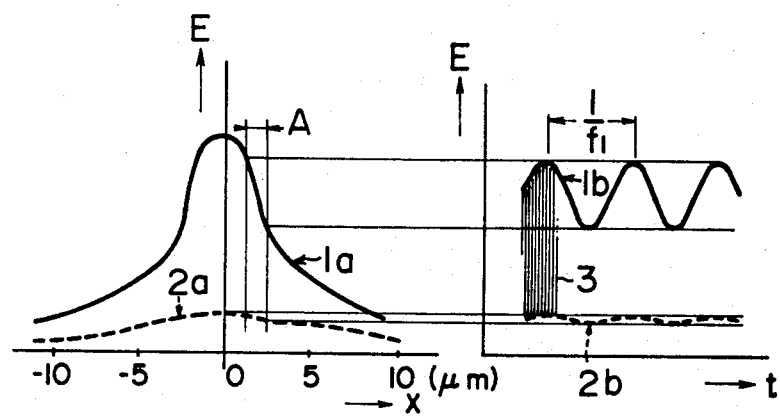
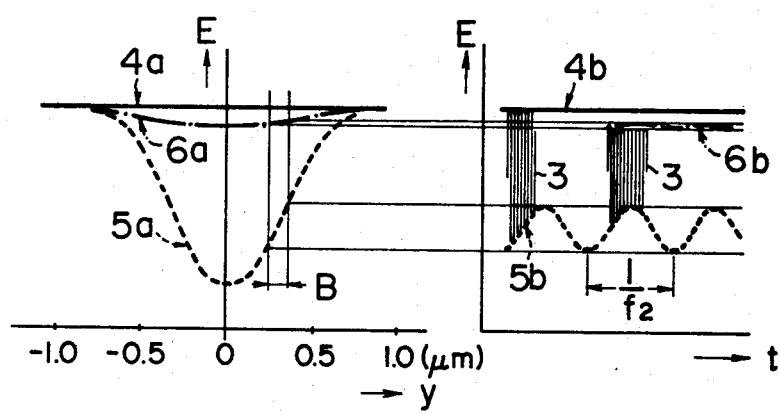
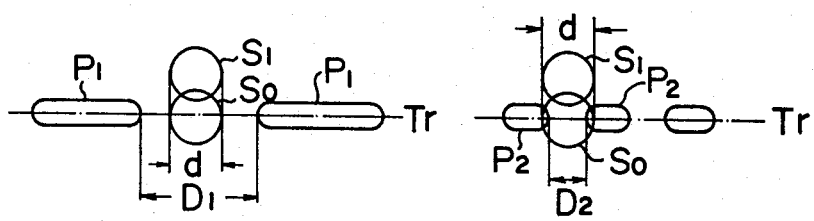

PHOTOELECTRIC FOCUS AND TRACKING APPARATUS

BACKGROUND OF THE INVENTION

1. Field of the Invention

This invention relates to an apparatus for controlling the position of a light beam, especially adapted for use in an optical information reading apparatus.

2. Description of the Prior Art

In the case where information stored in the surface of a recording medium having the shape of a disc (hereafter referred to simply as a disc) is read out by irradiating the disc surface with laser light etc., there is a need for both a focusing control for exactly focusing the light on the surface of the disc and a tracking control for causing the spot of the light to follow up the information track formed in the disc surface and moving constantly.

There have hitherto been proposed a variety of automatic focusing and tracking control methods and one example is the wobbling method. According to this method, a light beam which is subjected to a small oscillation having a constant frequency, is projected onto the surface of a disc, that part of the light which is reflected from or has passed through the disc is received by a light detector, and the positional deviation of the light beam is detected by measuring the amplitude of the output of the light detector, whereby the position of the light beam is controlled by operating the control system in such a manner that the positional deviation becomes zero.

First, the wobbling method as described above will be explained with the aid of the attached drawings. FIG. 1 schematically shows a conventional automatic focus control apparatus using the wobbling method. The laser light emitted from a laser light source 131 passes through a first lens 132 and a semi-transparent mirror 133, is reflected by a reflecting mirror 134 and converged by an objective lens 142, and is focused on the surface of a video disc 136 which is a moving object. The focused light is then reflected by the surface of the video disc 136 and sent back traveling the path along which it has reached the video disc. The light traveling back is again reflected by the semi-transparent mirror 133, passes through a pin hole in a diaphragm 137, and is received by a light detector 138. The diaphragm 137 may be omitted if the light detector 138 has a very small light receiving area. The information stored optically in the video disc 136 can thus be obtained as the output of the light detector 138, which is available at an information source terminal 139.

FIG. 2 shows the output characteristic of the light detector 138. In FIG. 2, the abscissae x represent the distance between the objective lens and the disc surface and the ordinates E represent the output of the light detector.

In the apparatus shown in FIG. 1, the diaphragm 137 is so located that the output of the light detector 138 becomes maximum when the light emitted from the objective lens 142 is focused exactly on the surface of the video disc 136. Let $x_o$ be the distance between the lens 142 and the surface of the video disc 136, assumed when the output E of the detector 138 is maximum. Then, as shown in FIG. 2, if $x=x_o$, E equals its maximum value $E_o$. This means that the focus of the objective lens 142 lies exactly on the surface of the video disc 136. If $x>x_o$, the focal point of the lens 142 is found to lie before the disc surface. The output of the light detector 138 varies almost symmetrically with respect to $x_o$, as shown in FIG. 2. Accordingly, if the objective lens is oscillated in a direction parallel to the optical axis with the focal point of the lens located before the disc surface, that is, with the lens-to-surface distance $x_A$ greater than $x_o$, then the output of the light detector oscillates out of phase by 180° from the oscillation of the objective lens. On the other hand, if the lens is oscillated with $x_A$ kept smaller than $x_o$, the oscillation of the output of the light detector is in phase with that of the objective lens. The excursion of the output E of the light detector increases with the increase in the absolute value of the difference between $x_A$ and $x_o$.

In view of these facts, use is made of a means for synchronously rectifying the output of the light detector by multiplying the output by values varying in accordance with the mode of the oscillation of the objective lens. This means will be explained with the aid of FIG. 1.

First, an oscillator 140 generates a sinusoidal output, which is amplified by a current amplifier 148 and then supplied to a voice coil 141 to subject the objective lens 142 to a small oscillation in a direction parallel to the optical axis. As a result of this oscillation, the output of the light detector 138 undulates as seen in FIG. 2.

Since the output of the light detector 138 includes a signal having the same frequency as the frequency of the sinusoidal output plus other components, i.e. the video signal from the video disc 136 etc., superposed upon it, a band-pass filter 144 is provided to allow only the signal close in frequency to the sinusoidal output of the oscillator 140 to pass therethrough. Although the objective lens 142 is subjected to oscillation by the sinusoidal output of the oscillator 140, its oscillation lags in phase to a certain extent behind the sinusoidal signal. Therefore, after having been adjusted in phase to the oscillation of the lens 142 by a phase adjusting device 143, the sinusoidal output is supplied to a multiplier 145 to make a product of it and the output of the light detector 138.

The output of the light detector 138, near the peak of the characteristic curve shown in FIG. 2, can be approximated by a quadratic expression. Accordingly, if the objective lens is oscillated as expressed by $b \cdot \sin \omega t$ with the deviation of the focal point equal to $(x_A - x_o)$, the output of the light detector 138 is given by the expression:

$$E = E_o - a(x_A + b\sin \omega t - x_o)^2.$$

When the output E is multiplied by $c \sin \omega t$ which is the sinusoidal signal representing the oscillation of the objective lens, the product e is as follows.

$$e = \{E_o - a(x_A + b \sin \omega t - x_o)^2\} c \sin \omega t$$

$$= \{E_o \cdot c - ac(x_A - x_o)^2 - \tfrac{1}{2} ab^2 c\} \sin \omega t +$$

$$\frac{abc}{2}(x_A - x_o) \cos 2\omega t + \frac{ab^2 c}{4} \sin 3\omega t - abc(x_A - x_o).$$

In this case, the focus adjustment is performed through the control of the distance between the objective lens and the video disc by the voice coil 141 in accordance with the deviation of the focal point. The angular frequency $\omega$ should be chosen to be sufficiently higher than the angular frequency of the change in the deviation $(x_A - x_o)$. When the signal representing the above product e is passed through a low-pass filter 146, the terms including sin ωt, cos 2ωt and sin 3ωt are eliminated and it follows that $$e \simeq -abc(x_A-x_o).$$

That is, the output of the low-pass filter 146 gives $5-(x_A-x_o)$ which carries the information about the direction and the amount of deviation of the focal point.

In response to the output of the low-pass filter 146, a control circuit 147 delivers a control signal, which, after having been amplified by a current amplifier 148, is applied to the voice coil 141 so as to control the position of the objective lens in such a manner that $(x_A-x_o)$ equals zero, that is, the focal point of the lens always lies on the surface of the video disc.

As described above, according to the wobbling method, the light beam emitted from a light source is slightly oscillated at a constant frequency (hereafter referred to as a wobbling frequency) in the direction parallel to the optical axis and directed upon the surface of a disc, that part of the light which is reflected from the surface of the disc or which has passed through the disc is received by a light detector, the direction and amount of the deviation of the focal point is measured by detecting the amplitude of the output of the light detector, whereby the focus control is effected. In this case, that component of the output of the light detector which has the wobbling frequency is exclusively extracted as the signal representing the deviation of the focal point. However, several components other than the wobbling frequency component, e.g. the signal representing the information stored on the disc, are superposed on the output of the light detector and therefore it is an essential problem for attaining stability in the control of the focal point to effectively detect only the wobbling frequency component from the detector output. In general, the wobbling frequency (e.g. about several tens of KHz) is about one order of magnitude lower than the frequencies in the frequency range (e.g. about several hundreds of KHz to 10 MHz) of the information signal and a band-pass filter has hitherto been used to extract only the signal having a frequency near the wobbling frequency. However, the band-pass filter has a poor efficiency for the separation of the desired signal. Accordingly, in order for the wobbling frequency component to serve sufficiently as the signal representing the focal deviation, it is necessary to increase the amplitude of the wobbling signal. If the amplitude of the wobbling signal becomes large, however, the information signal is modulated by the wobbling signal even in the absence of focal deviation. Consequently, the displacement caused by the wobbling cannot be neglected so that the stable control of the focal point becomes impossible.

In the preceding explanation, the control of focal point is exclusively explained, but a large wobbling signal will cause a similar adverse effect on the tracking control.

SUMMARY OF THE INVENTION

An object of this invention is to provide a light beam position control apparatus which can effectively detect the wobbling frequency component even when the wobbling signal has a very small amplitude and therefore which can perform a stable control of the focal point.

According to this invention, which has been made to attain the above object, the signal for controlling the focal point and the signal for tracking control are detected from that part of the envelope of a reproduced signal which is formed in a non-modulated state where pit information is not modulated and from that part of the envelope of a reproduced signal which is formed in a modulated state where pit information is modulated, respectively.

BRIEF DESCRIPTION OF THE DRAWINGS

FIGS. 3, 4, 5 and 6 graphically show the operating principle of this invention.

FIGS. 7 and 8 show the relative positions of light spots and information pits.

DESCRIPTION OF THE PREFERRED EMBODIMENTS

Figure 1:
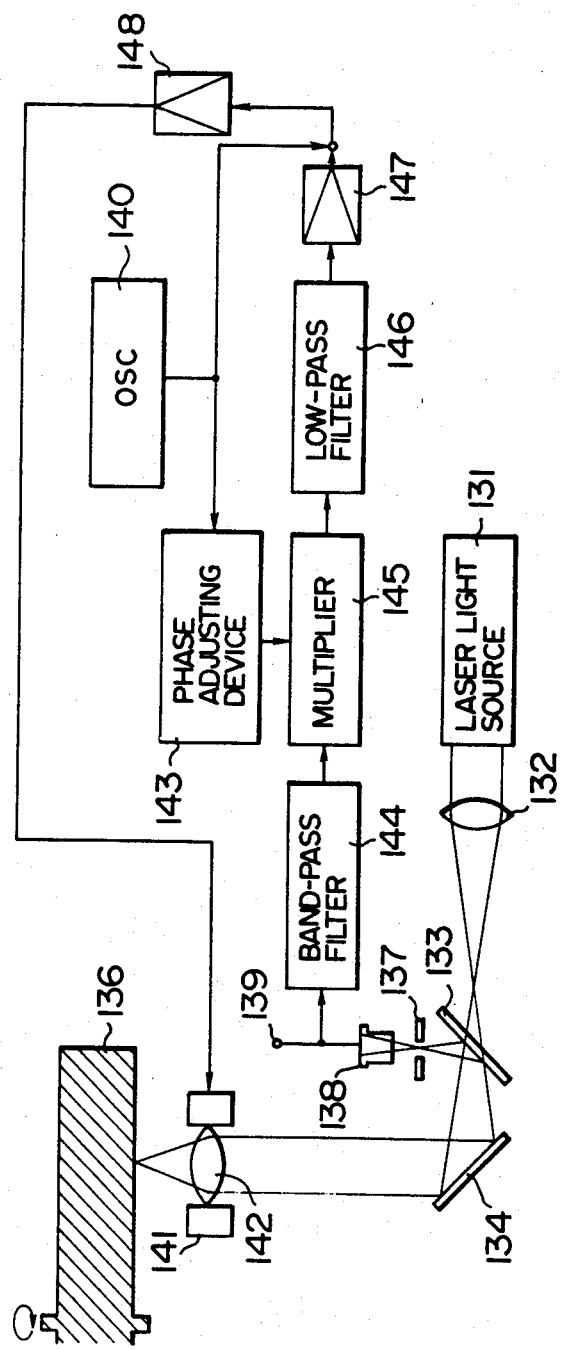
FIG. 1 schematically shows the constitution of a conventional autofocusing apparatus.
Figure 2:
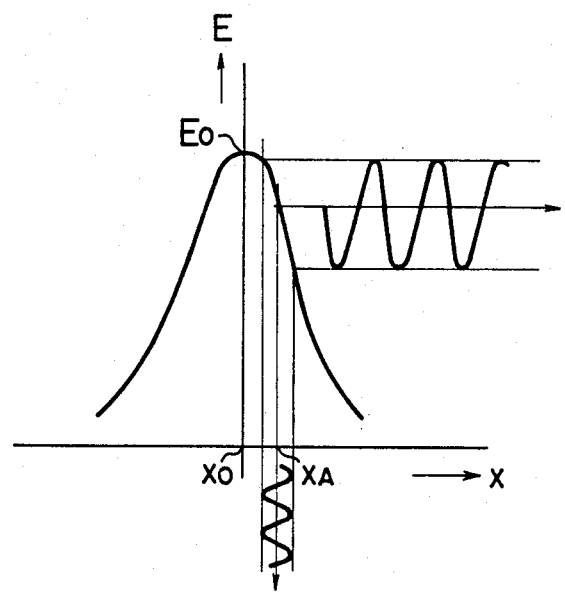
FIG. 2 illustrates the operating principle of the apparatus shown in FIG. 1.

The principle of this invention will be described as applied to the case where the change in the optical output due to the self-coupling effect in a semiconductor laser is to be detected. The self-coupling effect here mentioned refers to the phenomenon that if that part of the light emitted by a semiconductor laser apparatus which is reflected by a disc is fed back, the optical output of the laser apparatus changes in accordance with the change in the amount of the reflected light. Accordingly, if the optical output of the laser apparatus is received by a light detector disposed at that end of the laser apparatus which is opposite to the end of the apparatus facing the disc, the output of the light detector changes in accordance with the change in the optical output so that the intensity of the light reflected from the surface of the disc can be detected.

First, the way of controlling the position of the focal point of the objective lens will be described.

FIG. 3 shows the relationship between the position of the focal point of the objective lens and the output of the light detector in the case where the self-coupling effect is utilized, the abscissae x representing the amount of deviation of the focal point and the ordinates E representing the output of the light detector. Solid curve 1a corresponds to the output characteristic in the absence of information pits, that is, when no modulation is effected with pit information. This output characteristic shows that the self-coupling effect is greatest when the focal point of the objective lens lies exactly on the surface of the disc while the self-coupling effect decreases as the focal point gets farther from the disc surface. Broken curve 2a corresponds to the output characteristic in the presence of modulation, that is, when there are information pits in the disk surface so that modulation is effected with pit information. In this case, the amount of the reflected light decreases owing to the information pits and hence the self-coupling effect also decreases to decrease the output of the light detector. The amplitude of the information signal is bounded between the solid curve 1a and the broken curve 2a and the maximum information signal can be derived when the focal point of the objective lens is identical in position with the surface of the disc.

FIG. 4 shows the output characteristic of the light detector when the light beam is subjected to a wobbling with a frequency of $f_1$ and an amplitude of A in a direction parallel to the optical axis. In FIG. 4, the abscissae t represent time and the ordinates E represent the output of the light detector. The undulation of the upper envelope 1b (in the non-modulated state) and the lower envelope 2b (in the modulated state) gives evidence of the output 3 of the light detector being modulated in accordance with the wobbling frequency $f_1$. It should here be noted that the undulation of the upper envelope 1b (in the non-modulated state) has a greater amplitude than the lower envelope (in the modulated state). Namely, the upper envelope 1b is more subject to the modulation by wobbling than the lower envelope 2b. Therefore, to detect the signal representing the deviation of the focal point, it is not necessary to extract all the components having the wobbling frequency from the output of the light detector, but it is preferable to take out the upper envelope 1b of the detector output. In other words, it is only necessary, for obtaining the signal representing the deviation of focal point in the case of focus control, to rectify the upper envelope 1b of the detector output 3 in the non-modulated state where modulation with pit information is not effected.

Next, the tracking control will be described. FIG. 5 shows the relationship between the displacement of the information track and the output of the light detector. The abscissae y represent the amount of the deviation of the information track and the ordinates E represent the output of the light detector. In FIG. 5, solid curve 4a corresponds to the output characteristic in a non-modulated state, that is, when there is no information pit in the surface of the disc, and broken curve 5a corresponds to the output characteristic in a modulated state, that is, when there are information pits. If there are information pits, the beam is modulated by the pits so that the amount of the reflected light decreases to decrease the self-coupling effect. The degree of modulation by the information pits is greatest at the center of the information track and gradually decreases with an increasing deviation from the center of the track, so that the self-coupling effect is smallest at the center of the information track and gradually increases in accordance with the deviation from the center of the track. Accordingly, the output characteristic of the light detector, contrary to the case of the focus control, is flat in the non-modulated state and concave up (i.e. convex down) in the modulated state. Here, solid curve 4a corresponds to the case where the distance $D_1$ between two adjacent information pits $P_1$ is greater than the diameter d of the light spots $S_0$ and $S_1$, as shown in FIG. 7. In this case, if the light spot is between adjacent pits, the light beam is free from the modulation by the information pits irrespective of the position of the light spot, that is, whether the spot is at the center Tr of the information track (as in the case of the spot $S_0$ in FIG. 7) or misses the center Tr (as in the case of the spot $S_1$ in FIG. 7) since the light spot $S_0$ or $S_1$ is in this case completely outside the information pit $P_1$. Accordingly, the output of the light detector is flat as represented by the solid curve 4a in FIG. 5. In the case, however, where the distance $D_2$ between two adjacent information pits $P_2$ is smaller than the diameter d of the light spots $S_0$ and $S_1$, as shown in FIG. 8, the output of the light detector varies depending on the position of the light spot. When the light spot is at the center Tr of the information track (as in the case of the spot $S_0$ in FIG. 8), the light spot partially lies on the information pits $P_2$ while when the light spot misses the center Tr (as in the case of the light spot $S_1$ in FIG. 8), the spot is completely outside the pits $P_2$. Therefore, the light beam is modulated to a certain extent by the information pits so that the output characteristic of the light detector is concave up (i.e. convex down) as represented by the broken curve 6a in FIG. 5. Even in this case, the slack of the output characteristic 6a is by far smaller than that of the output characteristic 5a.

FIG. 6 shows the output of the light detector when the light beam is caused to wobble in the direction perpendicular to the information track, at a frequency of $f_2$ and with an amplitude of B. In FIG. 6, the abscissae t represent time and the ordinates E represent the output of the light detector. The output 3 of the light detector is modulated to a great extent, in a modulated state where modulation with pit information is effected, with the wobbling frequency $f_2$ and as a result of this the lower envelope (in the modulated state) of the output 3 of the light detector appears as shown by the broken curve 5b in FIG. 6. On the other hand, the output 3 of the light detector is completely free from modulation by the wobbling in a non-modulated state where modulation with pit information is not effected, i.e., when the pit-to-pit distance $D_1$ is greater than the diameter d of the light spots, as shown in FIG. 7. Therefore, the upper envelope (in the non-modulated state) of the detector output 3 appears as shown by the solid curve 4b in FIG. 6. However, as shown in FIG. 8, if the pit-to-pit distance $D_2$ is smaller than the diameter d of the light spot, the detector output 3 is modulated to some extent with the wobbling frequency $f_2$ even in a non-modulated state so that the upper envelope of the output 3 (in the non-modulated state) appears as shown by the broken curve 6b. In this case, the lower envelope 5b (under modulation) is much more subject to modulation by wobbling than the second-mentioned upper envelope (in the non-modulated state). It is therefore only necessary for the tracking control to rectify only the lower envelope 5b in the modulated state of the output 3 of the light detector so as to obtain a signal representing a tracking deviation.

As described above, in the case of the focus control or the tracking control according to the wobbling method, there exist optimal signals for representing the deviations of the focal point and the tracking deviation. This invention utilizes this fact. Namely, according to this invention, there is provided a light beam position control apparatus in which a light beam is emitted from a light source and directed upon the surface of a disc having desired information stored thereon, the intensity of the portion of the emitted light reflected from the surface or having passed through the disc is detected, the signal representing the deviation of the position of the light beam is detected by rectifying one of the two envelopes of a signal of the detected intensity, and the position of the light beam is controlled in accordance with the detected signal.

Now, this invention will be described by way of embodiment.

Figure 9:
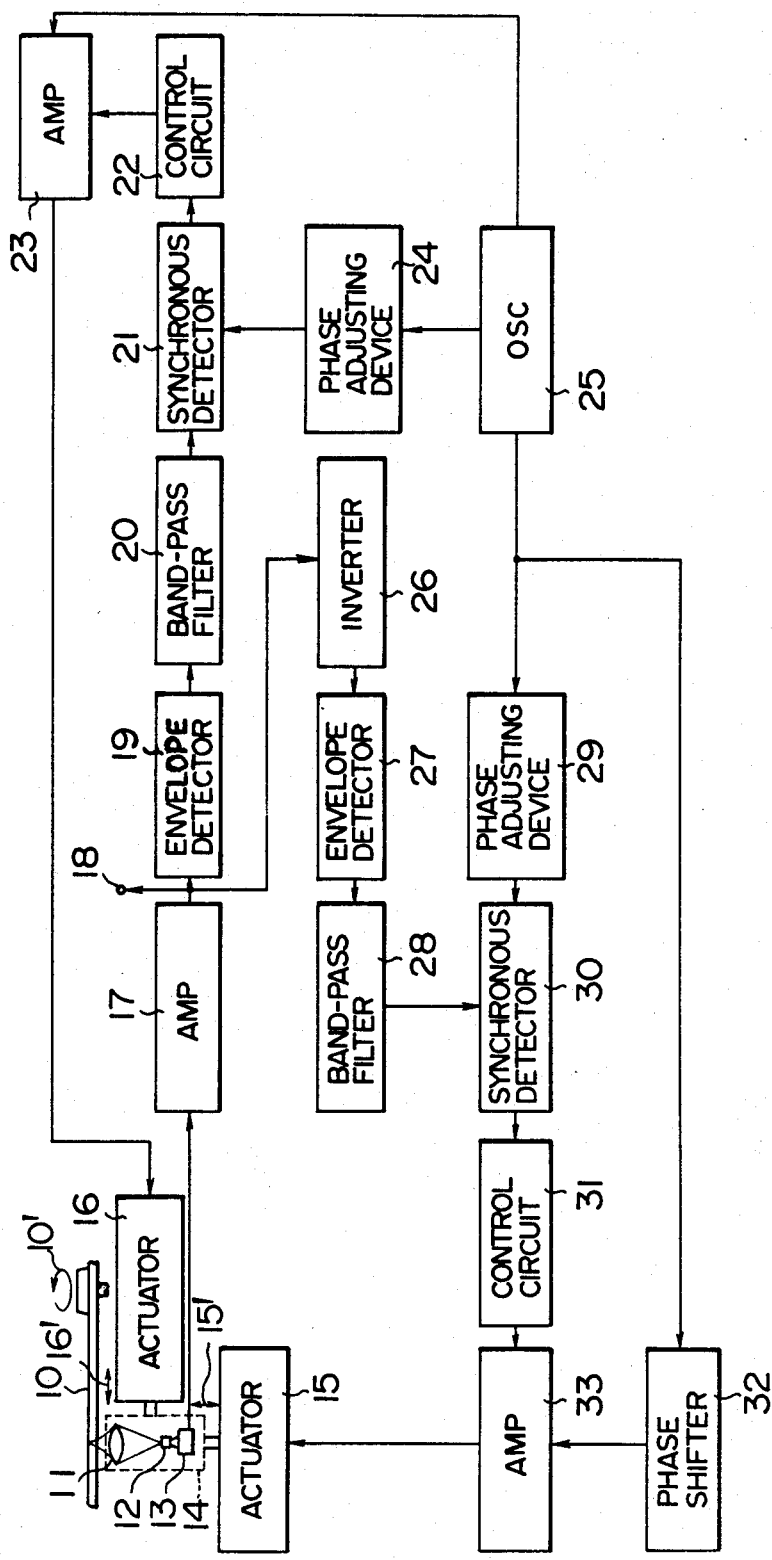
FIG. 9 shows a light beam position control apparatus as one embodiment of this invention.

FIG. 9 shows in block diagram the constitution of an embodiment of this invention, in which both the focus control and the tracking control are performed with the same wobbling frequency. Laser light sent out from a laser apparatus 12 is converged by a lens 11 and emitted on the surface of a disc 10 in rotary motion (indicated by an arrow 10'). The laser light is reflected by the surface of the disc 10, returned along the incoming path and fed back to the laser apparatus 12. In this case, the optical output of the laser apparatus 12 varies in accordance with the change in the amount of light reflected from the surface of the disc 10. The optical output is received by a photodetector 13 disposed at that end of the laser apparatus 12 which is opposite to the end of the apparatus facing the disc 10. Thus, the information stored in the disc 10 is reproduced as the output of the photodetector 13, which is amplified by an amplifier 17 and taken out through an information source terminal 18.

Figure 10:
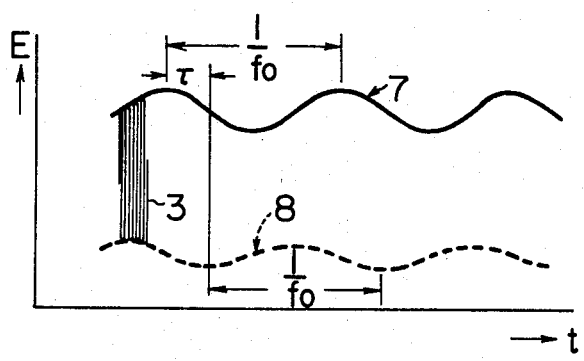
FIG. 10 illustrates the operation of the embodiment shown in FIG. 9.

In this embodiment, the lens 11, the semiconductor laser apparatus 12, and the photodetector 13 are united into a compact pickup 14 and the pickup 14 is slightly oscillated in the vertical direction (indicated by an arrow 15') with respect to the disc 10 by an actuator 15 as well as in the horizontal direction (indicated by an arrow 16') with respect to the disc 10 by an actuator 16. The actuator 15 is driven by the signal obtained by shifting the phase of the sinusoidal output (with frequency $f_o$) of an oscillator 25 by $\tau$ by a phase shifter 32 and then by amplifying the phase-shifted output by an amplifier 33. The actuator 16 is driven by the signal obtained by amplifying the sinusoidal output of the oscillator 25 by an amplifier 23. Accordingly, the pickup or optical head 14 is caused to wobble both horizontally and vertically at the same frequency $f_o$, the horizontal wobbling being out of phase by $\tau$ from the vertical wobbling. As a result of these wobblings, the photodetector 13 delivers an output 3 having a variable amplitude, as shown in FIG. 10. In FIG. 10, time t is measured along the abscissa and the output E of the photodetector 13 along the ordinate. The output in the non-modulated state is modulated by the vertical wobbling of the optical head and appears as the upper envelope 7 of the signal 3 as shown in FIG. 10. The output in the modulated state is modulated by the horizontal wobbling of the optical head 14 and appears as the lower envelope 8. The upper envelope 7 is out of phase by $\tau$ from the lower envelope 8.

In this embodiment, the envelope 7 in the non-modulated state is detected as an error signal for focus control from the output 3 of the photodetector and the envelope 8 in the modulated state is detected as an error signal for tracking control from the output 3, as shown in FIG. 10. The way of detecting these envelopes will be explained with the aid of FIG. 9.

First, the tracking control system will be described. After the output of the photodetector 13 has been amplified by an amplifier 17, the envelope in the modulated state of the output of the photodetector 13 (represented by the broken curve 8 in FIG. 10) is rectified by a single side envelope detector (diode detector) 19. Since the output of the envelope detector 19 contains not only the desired wobbling frequency components but also other superposed component such as, for example, a component due to uneven reflection from the surface of the disc 10, only the components having frequencies very close to the wobbling frequency are allowed to pass through a band-pass filter 20. The output of the band-pass filter 20 is supplied to a synchronous detector 21 and is synchronously detected in response to the sinusoidal signal from the oscillator 25. At this time, the sinusoidal signal from the oscillator 25 must be passed through a phase adjusting device 24 so as to be in phase with the horizontal wobbling of the optical head. This is because the pickup 14 (i.e. optical head), though it is driven by the sinusoidal signal from the oscillator 25, operates with its operation phase lagging a little behind that of the sinusoidal signal.

The output of the synchronous detector 21 is supplied to a control circuit 22 to be a tracking control signal. The output of the control circuit 22, i.e. the tracking control signal, is amplified by the amplifier 23 and then supplied to the actuator 16. Accordingly, the pickup 14 is horizontally shifted in accordance with the tracking control signal.

Next, the focus control system will be described. In the case of the focus control, contrary to the case of the tracking control, the envelope of the output of the photodetector 13 in the non-modulated state (represented by the solid curve 7 in FIG. 10) is to be detected. For this purpose, the output of the photodetector 13 is inverted by an inverter 26 and then detected by a single side envelope detector (diode detector) 27. The other parts of the constitution for this focus control are similar to those of the constitution for the tracking control. Namely, the output of the envelope detector 27 is supplied to a band-pass filter 28 to extract only components having frequencies very close to the wobbling frequency. The output of the band-pass filter 28 is synchronously detected by a synchronous detector 30 in response to the signal which is obtained by synchronizing the phase of the sinusoidal signal from the oscillator 25 with the vertical wobbling of the pickup 14 by a phase adjusting device 29. Then, the output of the synchronous detector 30 is sent to a control circuit 31, which delivers a focus control signal. The focus control signal is amplified by the amplifier 33 and then supplied to the actuator 15 so that the pickup 14 is vertically shifted in accordance with the focus control signal.

As described above, according to this invention, in the case where the focus control or the tracking control using the wobbling method, only the optimal signal representing the deviation of position in each control, that is, the envelope of the output of the photodetector in the non-modulated state for the deviation of focal point or the envelope of the same output in the modulated state for the tracking deviation, is detected. Consequently, the efficiency in detecting the signal representing the deviation of position can be about twice as large according to this invention as the efficiency attained by the conventional technique in which all the wobbling frequency components of the output of the photodetector are detected through a band-pass filter. Further, according to this invention, since only one of the two envelopes is detected in each control, the other envelope has no adverse effect on the control. This leads to the improvement in the signal-to-noise ratio of the detected signal. Moreover, when the focus control and the tracking control are both performed by using the wobbling method, different envelopes are detected in the respective control so that the respective signals representing the deviations of positions are prevented from mixing into each other. Thus, a stable control of light beam position can be obtained.

In the embodiment shown in FIG. 9, the intensity of the light reflected from the surface of the disc is detected through the detection of the change in the optical output due to the self-coupling effect occurring in semiconductor laser. However, it is also possible to directly detect the intensity of the light reflected from the disc surface by, for example, providing a semi-transparent mirror in the path of the reflected light and by leading the reflected light to a photodetector. Further, it is still possible to place a photodetector on the opposite side of the light source with respect to the disc and to detect the intensity of the light having passed through the disc.

We claim:

1. A light beam position control apparatus comprising:
    means for radiating a light beam onto a rotatable recording medium carrying trains of information pits on tracks on the recording medium to produce a modulated light beam in accordance with the presence and absence of information pits;
    wobbling means for oscillating said radiating means so that said light beam is oscillated periodically in a direction transverse to the tracks carrying the information pit trains;
    light detecting means for detecting the intensity of said modulated light beam;
    envelope detector means for detecting only that portion of the envelope of the output of said light detecting means which portion corresponds to the presence of information pits;
    means for effecting synchronous detection of the output of said envelope detector means with a signal having a phase identical with that of the oscillation of said light beam; and
    tracking means responsive to the output of said synchronous detection means for controlling said light beam so that the light beam tracks said information pit trains on said tracks.

2. A light beam position control apparatus comprising:
    radiating means for emitting a light beam;
    focusing means for focusing the light beam emitted by said radiating means onto a rotatable recording medium carrying trains of information pits on tracks on the recording medium to produce a modulated light beam in accordance with the presence and absence of information pits;
    wobbling means for effecting oscillation of the focal point of said light beam periodically in a direction parallel with the optical axis of said light beam;
    light detecting means for detecting the intensity of said modulated light beam;
    envelope detector means for detecting only that portion of the envelope of the output of said light detecting means which portion corresponds to the absence of information pits;
    means for effecting synchronous detection of the output of said envelope detector means with a signal having a phase identical with that of the oscillation of the focal point of said light beam; and
    means responsive to the output of said synchronous detection means for controlling said wobbling means so that the light beam is continuously focused on said recording medium.

3. A light beam position control apparatus comprising:
    radiating means for emitting a light beam;
    focusing means for focusing the light beam emitted by said radiating means onto a rotatable recording medium carrying trains of information pits on tracks on the recording medium to produce a modulated light beam in accordance with the presence and absence of information pits;
    first wobbling means for oscillating said radiating means with a first phase so that said light beam is oscillated periodically in a first direction transverse to the tracks of the information pit trains;
    second wobbling means for effecting oscillation of the focal point of said light beam with a second phase different from said first phase so that the focal point of said light beam is oscillated periodically in a second direction parallel with the optical axis of said light beam;
    light detecting means for detecting the intensity of said modulated light beam;
    first envelope detector means for detecting that portion of the envelope of the output of said light detecting means which portion corresponds to the presence of information pits;
    second envelope detector means for detecting that portion of the envelope of the output of said light detecting means which portion corresponds to the absence of information pits;
    first means for effecting synchronous detection of the output of said first envelope detector means with a first signal having a phase identical with that of the oscillation of said light beam in said first direction by said first wobbling means;
    second means for effecting synchronous detection of the output of said second envelope detector means with a second signal having a phase identical with that of the oscillation of the focal point of said light beam in said second direction by said second wobbling means;
    tracking control means responsive to the output of said first synchronous detection means for controlling said light beam so that the light beam tracks said information pit trains on said tracks; and
    focusing control means responsive to the output of said second synchronous detection means for controlling said second wobbling means so that the light beam is continuously focused on said recording medium.

4. An apparatus according to claim 3, in which said first wobbling means includes an oscillator for generating an oscillation for said periodical oscillation of said light beam in said first direction, and said second wobbling means includes said oscillator and phase shifter means for phase-shifting the oscillation of said oscillator for generating a phase-shifted oscillation for said periodical oscillation of the focal point of said light beam in said second direction.

5. An apparatus according to claim 3, further comprising a first band-pass filter provided between said first envelope detector means and said first synchronous detector means for passing only those components of the output of said first envelope detector means which have frequencies near and identical with the frequency of said oscillation of said light beam in said first direction.

6. An apparatus according to claim 3, further comprising a second band-pass filter provided between said second envelope detector means and said second synchronous detector means for passing only those components of the output of said second envelope detector means which have frequencies near and identical with the frequency of said oscillation of the focal point of said light beam in said second direction.

7. An apparatus according to claim 4, in which said oscillation output from said oscillator is a sinusoidal signal.

8. An apparatus according to claim 4 or claim 7, in which said first synchronous detector means includes a first phase adjusting device for making the phase of the oscillation from said oscillator identical with the phase of said oscillation of said light beam in said first direction and a synchronous detector for synchronously detecting the output of said first envelope detector means with the output of said first phase adjusting device.

9. An apparatus according to claim 4 or claim 7, in which said second synchronous detector means includes a second phase adjusting device for making the phase of the oscillation of said oscillator identical with the phase of said oscillation of the focal point of said light beam in said second direction and a synchronous detector for synchronously detecting the output of said second envelope detector means with the output of said second phase adjusting device.

10. An apparatus according to claim 3, in which said radiating means includes a semiconductor laser and said focusing means includes an optical system for focusing said light beam emitted from one end surface of said laser onto said recording medium, said optical system being arranged such that said radiated light beam is reflected from said recording medium back to said end surface of said laser through said optical system, and said light detecting means includes a light detector for receiving a light beam emitted from the opposite end surface of said laser.

11. An apparatus according to claim 10, in which an optical head is constituted by said semiconductor laser, said optical system and said light detecting means, and a first common actuator is further provided for use in the oscillation of said optical head in said first direction by said first wobbling means and for use in said tracking by said tracking means.

12. An apparatus according to claim 10, in which an optical head is constituted by said semiconductor laser, said optical system and said light detecting means, and a second common actuator is further provided for use in the oscillation of said optical head in said second direction and for use in said focusing by said focusing means.

13. An apparatus according to claim 3, in which said light detecting means includes a light detector for receiving said reflection.

14. An apparatus according to claim 3, in which said light detecting means is disposed on the opposite side of said recording medium with respect to said radiating means and includes a light detector for receiving a light beam from said radiating means having passed through said recording medium.

* * * * *